US012707260B2

(12) United States Patent
Landais et al.

(10) Patent No.: US 12,707,260 B2
(45) Date of Patent: Aug. 11, 2026

(54) NETWORK REPOSITORY FUNCTION SERVICES ACCESS AUTHORIZATION

(71) Applicant: Nokia Technologies Oy, Espoo (FI)

(72) Inventors: Bruno Landais, Lannion (FR); Saurabh Khare, Bangalore (IN); Xin Wang, Qingdao (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 11 days.

(21) Appl. No.: 18/575,881

(22) PCT Filed: Jul. 1, 2021

(86) PCT No.: PCT/CN2021/104118

§ 371 (c)(1),
(2) Date: Jan. 1, 2024

(87) PCT Pub. No.: WO2023/272706

PCT Pub. Date: Jan. 5, 2023

(65) Prior Publication Data

US 2024/0314557 A1 Sep. 19, 2024

(51) Int. Cl.
*H04W 12/06* (2021.01)
*G06F 21/00* (2013.01)
(Continued)

(52) U.S. Cl.
CPC ............ *H04W 12/06* (2013.01); *G06F 21/44* (2013.01); *G06F 21/57* (2013.01)

(58) Field of Classification Search
CPC ........ H04W 12/06; G06F 21/44; G06F 21/57; G06F 21/30; G06F 21/445; G06F 21/45; G06F 21/604
See application file for complete search history.

(56) References Cited

U.S. PATENT DOCUMENTS

2009/0313353 A1* 12/2009 Lou ......................... H04L 67/06
709/219
2019/0028474 A1* 1/2019 Chen .................. H04L 63/0884

FOREIGN PATENT DOCUMENTS

WO 2020/030852 A1 2/2020
WO 2020/141355 A1 7/2020
(Continued)

OTHER PUBLICATIONS

"3rd Generation Partnership Project; Technical Specification Group Core Network and Terminals; 5G System; Network Function Repository Services; Stage 3 (Release 15)", 3GPP TS 29.510, V0.7.0, May 2018, pp. 1-65.
(Continued)

*Primary Examiner* — Edward Zee
(74) *Attorney, Agent, or Firm* — SQUIRE PATTON BOGGS (US) LLP

(57) ABSTRACT

Embodiments of the present disclosure relate to devices, methods, apparatuses and computer readable storage media of NRF services access authorization. The method comprises generating, at a first device, an indication of whether an authorization is required for accessing a service provided by the first device; and transmitting the indication to a second device. With the solution of the present disclosure, the indication of whether an authorization is required for accessing a service provided by the NRF can be provided from the NRF to other NFs, which may improve the system performance without increasing the extra signaling overhead.

13 Claims, 8 Drawing Sheets

(51) Int. Cl.
*G06F 21/44* (2013.01)
*G06F 21/57* (2013.01)

(56) References Cited

FOREIGN PATENT DOCUMENTS

| | | | |
|---|---|---|---|
| WO | 2020/141356 | A1 | 7/2020 |
| WO | 2020/190016 | A1 | 9/2020 |
| WO | 2020/221956 | A1 | 11/2020 |
| WO | 2021/028193 | A1 | 2/2021 |

OTHER PUBLICATIONS

"3rd Generation Partnership Project; Technical Specification Group Core Network and Terminals; 5G System; Network Slice Selection Services; Stage 3 (Release 17)", 3GPP TS 29.531, V17.0.0, Mar. 2021, pp. 1-77.

"3rd Generation Partnership Project; Technical Specification Group Core Network and Terminals; 5G System; Technical Realization of Service Based Architecture; Stage 3 (Release 17)", 3GPP TS 29.500, V17.2.0, Mar. 2021, pp. 1-100.

"3rd Generation Partnership Project; Technical Specification Group Core Network and Terminals; 5G System; Session Management Services; Stage 3 (Release 17)", 3GPP TS 29.502, V17.0.0, Mar. 2021, pp. 1-292.

"3rd Generation Partnership Project; Technical Specification Group Services and System Aspects; System architecture for the 5G System (5GS); Stage 2 (Release 17)", 3GPP TS 23.501, V17.0.0, Mar. 2021, pp. 1-489.

"3rd Generation Partnership Project; Technical Specification Group Services and System Aspects; Security architecture and procedures for 5G system (Release 15)", 3GPP TS 33.501, V15.2.0, Sep. 2018, pp. 1-175.

"Misalignment on access token request requirement TS 29.510 and 33.501", 3GPP TSG-SA3 Meeting #101-e, S3-203495, SA3, Nov. 9-20, 2020, 1 page.

"Misalignment on access token request requirement TS 29.510 and 33.501", 3GPP TSG-CT WG4 Meeting #102-e, C4-211156, SA3, Feb. 24-Mar. 5, 2021, 2 pages.

Hardt, "The OAuth 2.0 Authorization Framework", RFC 6749, Internet Engineering Task Force (IETF), Oct. 2012, pp. 1-76.

Jones et al., "OAuth 2.0 Dynamic Client Registration Protocol", RFC 7591, Internet Engineering Task Force (IETF), Jul. 2015, pp. 1-39.

International Search Report and Written Opinion received for corresponding Patent Cooperation Treaty Application No. PCT/CN2021/104118, dated Mar. 30, 2022, 9 pages.

"Authorization in the Subscribe-Notify interaction scenarios", 3GPP TSG-SA3 Meeting ad-hoc, S3-200688, Huawei, Apr. 14-17, 2020, 10 pages.

Extended European Search Report received for corresponding European Patent Application No. 21947657.9, dated Jan. 20, 2025, 8 pages.

Indian Office Action corresponding to IN Application No. 202447002917, dated Mar. 13, 2026.

Communication pursuant to Article 94(3) EPC, corresponding to EP Application No. 21 947 657.9, dated Mar. 11, 2026.

"3rd Generation Partnership Project; Technical Specification Group Services and System Aspects; Liberty Alliance and 3GPP security interworking; Interworking of Liberty Alliance Identity Federation Framework (ID-FF), Identity Web Services Framework (ID-WSF) and Generic Authentication Architecture (GAA)", (Release 16), 3GPP TR 33.980 V16.0.0 (Jul. 2020), XP051924945, 40 pages.

"3rd Generation Partnership Project; Technical Specification Group Core Network and Terminals; Bootstrapping interface (Ub) and network application function interface (Ua); Protocol details", (Release 16), 3GPP TS 24.109 V16.0.0 (Jul. 2020), XP051924405, 77 pages.

"3rd Generation Partnership Project; Technical Specification Group Services and System Aspects; Generic Authentication Architecture (GAA); Generic Bootstrapping Architecture (GBA)", (Release 17), 3GPP TS 33.220 V17.0.0 (Dec. 2020), XP051999369, 95 pages.

* cited by examiner

NETWORK REPOSITORY FUNCTION SERVICES ACCESS AUTHORIZATION

RELATED APPLICATION

This application was originally filed as PCT Application No. PCT/CN2021/104118, filed on Jul. 1, 2021, of which is incorporated herein by reference in its entirety.

FIELD

Embodiments of the present disclosure generally relate to the field of telecommunication and in particular to devices, methods, apparatuses and computer readable storage media of Network Repository Function (NRF) services access authorization.

BACKGROUND

The 5G Core (5GC) Service Based Architecture (SBA) was introduced by Third Generation Partnership Project Services and System Aspects Work Group 2 (3GPP SA2), where Network Function (NF) Service concept represents one type of capability exposed by an NF service producer to other authorized NF service consumer through a service-based interface.

The OAuth2 service access authorization framework is used in 5GC to control whether an NF service consumer is authorized to invoke a service (or service operation) of an NF service producer. In this framework, the NRF may act as the OAuth2 authorization server. The OAuth2 may also be used to control the access to the NRF services (e.g. to authorize an NF to register to NRF or to discover other NFs), independently from the use of OAuth2 for other 5GC services.

SUMMARY

In general, example embodiments of the present disclosure provide a solution of NRF services access authorization.

In a first aspect, there is provided a method. The method comprises generating, at a first device, an indication of whether an authorization is required for accessing a service provided by the first device; and transmitting the indication to a second device.

In a second aspect, there is provided a method. The method comprises receiving at a second device and from a first device, an indication of whether an authorization is required for accessing a service provided by the first device; and determining an authorization requirement of the first device for accessing the service provided by the first device based on the indication.

In a third aspect, there is provided a first device. The first device comprises at least one processor; and at least one memory including computer program codes: the at least one memory and the computer program codes are configured to, with the at least one processor, cause the first device at least to perform the method according to the first aspect.

In a fourth aspect, there is provided a second device. The second device comprises at least one processor; and at least one memory including computer program codes: the at least one memory and the computer program codes are configured to, with the at least one processor, cause the second device at least to perform the method according to the second aspect.

In a fifth aspect, there is provided an apparatus comprising means for generating, at a first device, an indication of whether an authorization is required for accessing a service provided by the first device; and means for transmitting the indication to a second device.

In a sixth aspect, there is provided an apparatus comprising means for receiving at a second device and from a first device, an indication of whether an authorization is required for accessing a service provided by the first device; and means for determining an authorization requirement of the first device for accessing the service provided by the first device based on the indication.

In a seventh aspect, there is provided a computer readable medium having a computer program stored thereon which, when executed by at least one processor of a device, causes the device to carry out the method according to the first aspect.

In an eighth aspect, there is provided a computer readable medium having a computer program stored thereon which, when executed by at least one processor of a device, causes the device to carry out the method according to the second aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
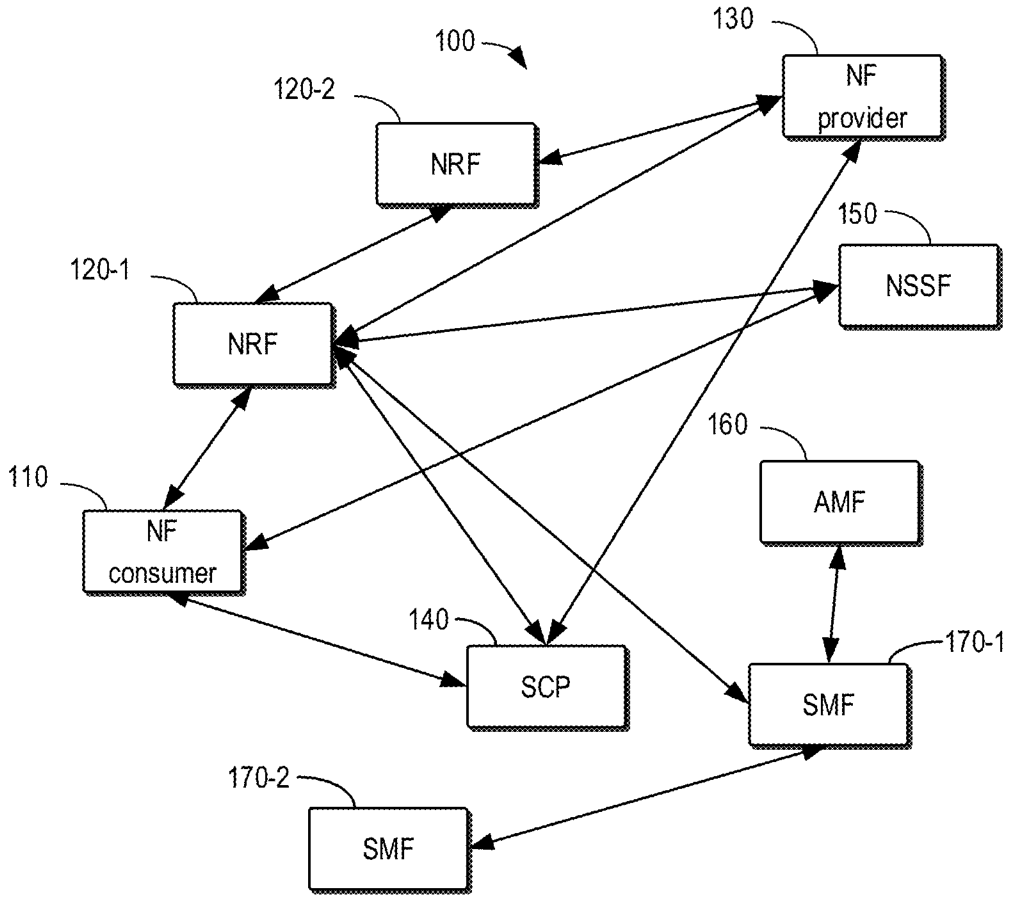
FIG. 1 illustrates an example environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G the third generation (3G), the fourth generation (4G), 4.5G the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. A RAN split architecture comprises a gNB-CU (Centralized unit, hosting RRC, SDAP and PDCP) controlling a plurality of gNB-DUs (Distributed unit, hosting RLC, MAC and PHY). A relay node may correspond to DU part of the IAB node.

The term "terminal device" refers to any end device that may be capable of wireless communication. By way of example rather than limitation, a terminal device may also be referred to as a communication device, user equipment (UE), a subscriber station (SS), a portable subscriber station, a mobile station (MS), or an access terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. As shown in FIG. 1, the communication network 100 may comprise multiple NFs having capabilities for providing one or more specific services. For example, the communication network 100 may comprise a Network Function consumer (NFc) 110 and a Network Function provider (NFp) 130. In general, the NFc 110 may request a specific service provided from the NFp 130. In some scenario, the NFc 110 can also be a network function provider for the NFp 130, when the NFp request a specific service provided from the NFc 110.

The communication network 100 may also comprise a first NRF 120-1 and a second NRF 120-2 (hereinafter may also be referred to as a NRF 120 collectively, or may also be referred to as a visiting NRF 120-1 and a home NRF 120-2 in some scenarios, respectively). In 5GC SBA, to be discovered and consumed by other NFs, each NF instance needs to be registered to the NRF. For example, the NRF 120 may support the corresponding functionalities, such as receiving NF Discovery Request from a NF instance, providing the information of the discovered NF instances (be discovered) to the NF instance and maintaining the NF profile of available NF instances and their supported services. In the communication network 100, both the NFc 110 and the NFp 130 can be registered to the NRF 120.

Furthermore, the communication network 100 may also comprise other NFs such as a first Session Management Element (SMF) 170-1 and a second SMF 170-2, to implement session management functions in the communication network 100. Hereinafter the first SMF 170-1 and the second SMF 170-2 may also be referred as an intermediate SMF 170-1 and a visiting SMF 170-2, respectively.

The communication network 100 may also comprise an Access and Mobility Management function (AMF) 160, which may be used for providing various functions relating to security and access management and authorization and a Network Slice Selection Function (150), which can be used by the AMF 160 to assist with the selection of the network slice instances that will serve a particular device.

Moreover, the communication network 100 may also comprise a Service Communication Proxy (SCP) 140, which may act as a control point in the middle of the network core and may provide the indirect communication between the network elements.

In the communication network 100, the NFs such as the AMF 160, the NSSF 150 and the SMF 170-1 and 170-2 can also be considered as a network function consumer or a network function provider in some scenarios.

In the context of the present disclosure, the NRF 120 or the home NRF 120-2 may also be referred to as a first device in some cases. The NFc 110, the visiting NRF 120-1, the SCP 140, the NSSF 150, the AMF 160 and the intermediate SMF 170-1 can also be referred to as a second device in some cases. The NFc 110, the SCP 140 and the intermediate SMF 170-1 can also be referred to as a third device in some cases.

As described above, the OAuth2 service may be used to control the access to the NRF services (e.g. to authorize an NF to register to NRF or to discover other NFs), independently from the use of OAuth2 service for other 5GC services. For all services other than the NRF services, an NF service consumer or SCP can discover whether OAuth2-based authorization is required to consume the service by looking at the NF profile registered by the NFp in a NRF.

In this situation, as an option, an NF service consumer or SCP can discover whether OAuth2-based authorization is required to access the NRF services based on the local configuration. However, if all 5GC NFs and SCPs must be configured with such policy for all NRFs in the PLMN, similar configuration for accessing NRF services from another PLMN is also be required, which may cause enormous network overhead.

As another option, if the NF service consumer or SCP discovers whether OAuth2-based authorization is required to access the NRF services by attempting to invoke the service without access token, the NF service consumer or SCP may request the access token only after an error response due to the missing of the access token is received. The process may cause extra signaling or a rejection of the service.

The present disclosure provides solutions of NRF services access authorization. In this solution, the first device may generate an indication of whether an authorization is required for accessing a service provided by the first device and transmit the indication to the second device, to cause to the second device to determine the authorization requirement of the first device based on the indication.

Principle and implementations of the present disclosure will be described in detail below with reference to FIGS. 2-9.

Figure 2:
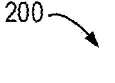
FIGS. 2, 3, 4, 5, 6, 7, 8, and 9 shows signaling charges illustrating processes of NRF services access authorization according to some example embodiments of the present disclosure.
Figure 2:
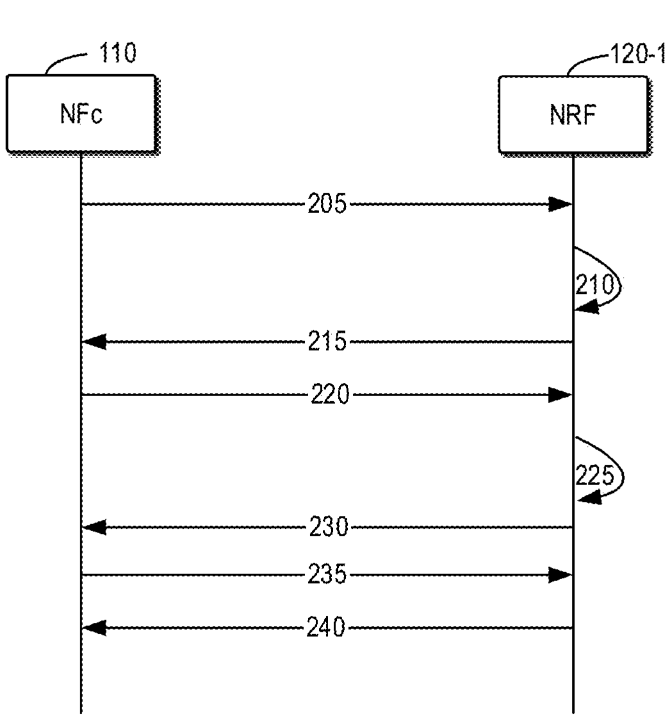

FIG. 2 shows a schematic process 200 of NRF services access authorization. For the purpose of discussion, the process 200 will be described with reference to FIG. 1. The process 200 may involve the NFc 110 and the NRF 120 as illustrated in FIG. 1.

As shown in FIG. 2, the NFc 110 may send 205 a bootstrapping request to the NRF 120. After receiving the bootstrapping request, the NRF 120 may generate 210 a response to the bootstrapping request. In addition to the bootstrapping information, the response may also comprise an indication of whether an authorization is required for accessing a service provided by the NRF 120.

Then the NRF 120 may send 215 the response to the NFc 110. After obtaining the indication of whether an authorization is required for accessing a service provided by the NRF 120, the NFc 110 may determine the authorization requirement of the NRF 120 based on the indication.

If the NFc 110 determines that the authorization is required for accessing the service provided by the NRF 120, the NFc 110 may send 220 to the NRF 120 a request for the authorization for accessing the service provided by the NRF 120. If the NRF 120 determines that the service required by the NFc 110 is authorized to be accessed by the NFc 110, the NRF 120 may generate 225 authorization information for the NFc 110 to access the service and send 230 the authorization information to the NFc 110. Hereinafter the term “authorization information” may be considered as an access token.

After obtaining the authorization information, the NFc 110 may send 235 a request for the service to the NRF 120 including the authorization information. Once the NRF 120 determines that the authorization information for the NFc 110 to access the service is received and valid, the NRF 120 may provide the service to the NFc 110.

It is to be understood that the above-described process 200 can also be performed between any 5GC NF consuming NRF services and the NRF 120 when they send a bootstrapping request to the NRF 120. Furthermore, the above-described process 200 can also be performed between an SCP and the NRF 120.

Figure 3:
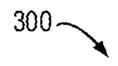
Figure 3:
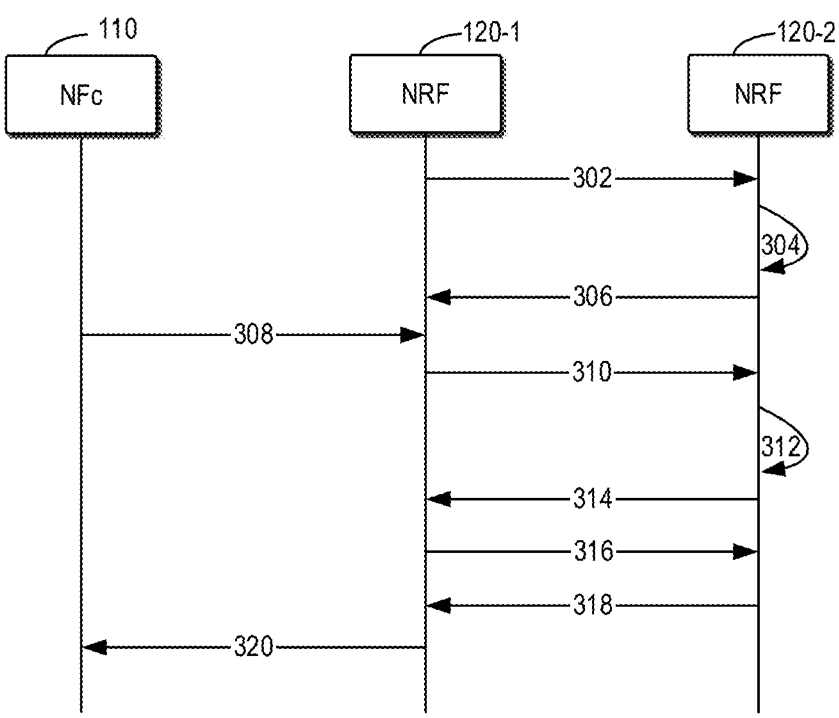

FIG. 3 shows a schematic process 300 of NRF services access authorization. For the purpose of discussion, the process 300 will be described with reference to FIG. 1. The process 300 may involve the NFc 110, the first NRF 120-1 and the second NRF 120-2 as illustrated in FIG. 1. In the scenario shown in FIG. 3, the first NRF 120-1 may act as a visiting NRF and the second NRF 120-2 may act as a home NRF.

As shown in FIG. 3, the first NRF 120-1 may send 302 a bootstrapping request to the second NRF 120-2. The bootstrapping request may comprise the identification of the network associated with the first NRF 120-1. For example, the identification can be referred to as an identification of the Public Land Mobile Network (PLMNID) of the first NRF 120-1.

After receiving the bootstrapping request, the second NRF 120-2 may generate 304 a response to the bootstrapping request. In addition to the bootstrapping information, the response may also comprise an indication of whether an authorization is required for accessing a service provided by the second NRF 120-2. The indication may be associated with the identification of the network associated with the first NRF 120-1.

Then the second NRF 120-2 may send 306 the response to the first NRF 120-1. After obtaining the indication of whether an authorization is required for accessing a service provided by the second NRF 120-2, the first NRF 120-1 may determine the authorization requirement of the second NRF 120-2 based on the indication.

If the first NRF 120-1 determines that the authorization is required for accessing the service provided by the second NRF 120-2, the first NRF 120-1 may record the authorization requirement of the second NRF 120-2.

When the first NRF 120-1 receives 308 a request for the service from a NFc 110, and the first NRF 120-1 determines that the service requested by the NFc 110 is provided by the second NRF 120-2, the first NRF 120-1 may send 310 to the second NRF 120-2 a request for the authorization for the NFc 110 to access the service provided by the second NRF 120-2.

If the second NRF 120-2 determines that the service required by the NFc 110 is authorized to be accessed, the second NRF 120-2 may generate 312 authorization information for the NFc 110 to access the service. Then the second NRF 120-2 may send 314 the authorization information to the first NRF 120-1.

After obtaining the authorization information, the first NRF 120-1 may send 316 a request for the service to the second NRF 120-2 including the authorization information. Once the second NRF 120-2 determines that the authorization information for the NFc 110 to access the service is received and valid, the second NRF 120-2 may provide 318 the service to the first NRF 120-1. Then the first NRF 120-1 may forward 320 the service to the NFc 110.

The above-described process 300 is directed to a scenario where a first NRF 120-1 (for example, a visiting NRF) can request an access token on behalf of the NFc 110 if the first NRF 120-1 discovered that a second NRF 120-2 (for example, a home NRF) requires OAuth2 based access authorization to access the corresponding NRF service of the second NRF 120-2.

As another option, it is also possible the first NRF 120-1 may also reject requiring an access token from the second NRF 120-2 on behalf of NFc 110, to allow the NFc 110 to access a service in NRF 120-2. This scenario may be described with reference to FIG. 4.

Figure 4:
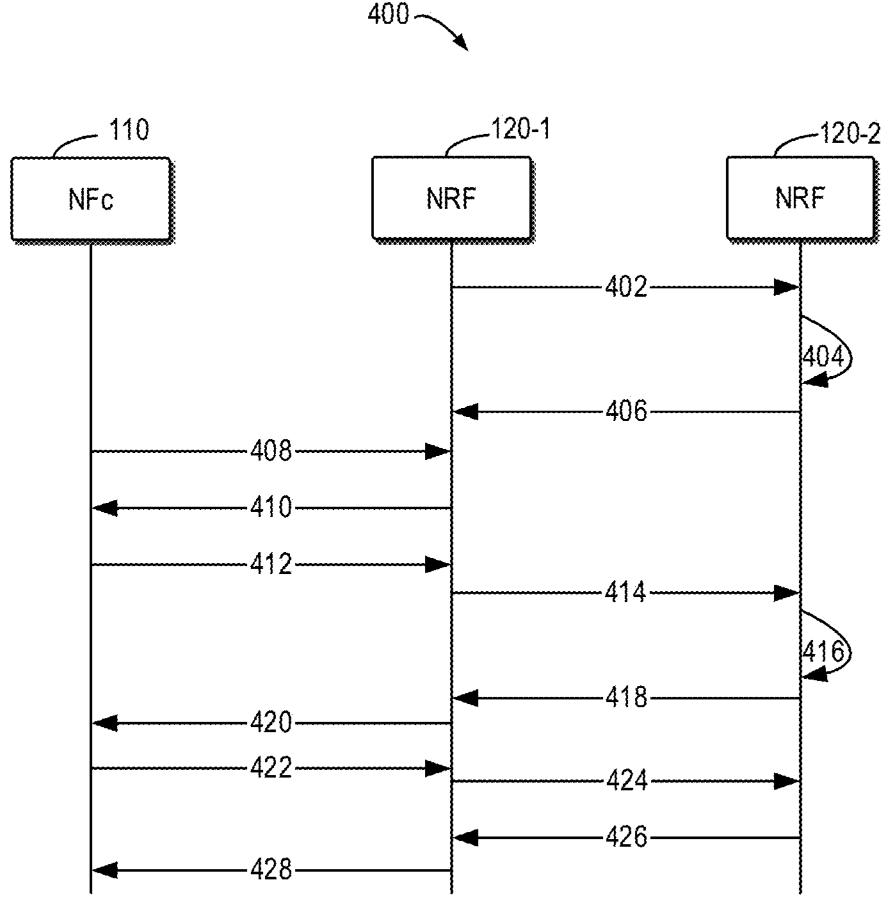

FIG. 4 shows a schematic process 400 of NRF services access authorization. For the purpose of discussion, the process 400 will be described with reference to FIG. 1. The process 400 may involve the NFc 110, the first NRF 120-1 and the second NRF 120-2 as illustrated in FIG. 1. In the scenario shown in FIG. 4, the first NRF 120-1 may act as a visiting NRF and the second NRF 120-2 may act as a home NRF.

The acts 402 to 406 in the process 400 may be similar with the acts 302 to 306 in the process 300. As shown in FIG. 4, the first NRF 120-1 may send 402 a bootstrapping request to the second NRF 120-2. The bootstrapping request may comprise the identification of the network associated with the first NRF 120-1.

After receiving the bootstrapping request, the second NRF 120-2 may generate 404 a response to the bootstrapping request. In addition to the bootstrapping information, the response may also comprise an indication of whether an authorization is required for accessing a service provided by the second NRF 120-2. The indication may be associated with the identification of the network associated with the first NRF 120-1.

Then the second NRF 120-2 may send 406 the response to the first NRF 120-1. After obtaining the indication of whether an authorization is required for accessing a service provided by the second NRF 120-2, the first NRF 120-1 may determine the authorization requirement of the second NRF 120-2 based on the indication.

If the first NRF 120-1 determines that the authorization is required for accessing the service provided by the second NRF 120-2, the first NRF 120-1 may record the authorization requirement of the second NRF 120-2.

When the first NRF 120-1 receives 308 a request for the service from a NFc 110, and the first NRF 120-1 determines that the service requested by the NFc 110 is provided by the second NRF 120-2, the first NRF 120-1 may reject the request for the service from a NFc 110 by sending 410 an error response.

By receiving the error response, the NFc 110 may be aware of the authorization requirement of the second NRF 120-2.

Then the NFc 110 may send 412 to the first NRF 120-1 a request for the authorization for the NFc 110 to access the service provided by the second NRF 120-2. The first NRF 120-1 may forward 414 the request for the authorization for the NFc 110 to the second NRF 120-2.

If the second NRF 120-2 determines that the service required by the NFc 110 is authorized to be accessed, the second NRF 120-2 may generate 416 authorization information for the NFc 110 to access the service. Then the second NRF 120-2 may send 418 the authorization information to the first NRF 120-1. Then the first NRF 120-1 may forward 420 the authorization information to the NFc 110.

After obtaining the authorization information, the NFc 110 may send 422 a request for the service to the first NRF 120-1 including the authorization information. Then the first NRF 120-1 forwards 424 the request for the service including the authorization information to the second NRF 120-2.

Once the second NRF 120-2 determines that the authorization information for the NFc 110 to access the service is received and valid, the second NRF 120-2 may provide 426 the service to the first NRF 120-1. Then the first NRF 120-1 may forward 428 the service to the NFc 110.

In some example embodiments, when a NFc or a SCP sends a bootstrapping request to a visiting NRF, the visiting NRF may return in bootstrapping response to the NFc or a SCP whether a home NRF(s) requires use of OAuth2 per roaming partner's PLMN IDs. This scenario can be described with reference to FIG. 5.

Figure 5:
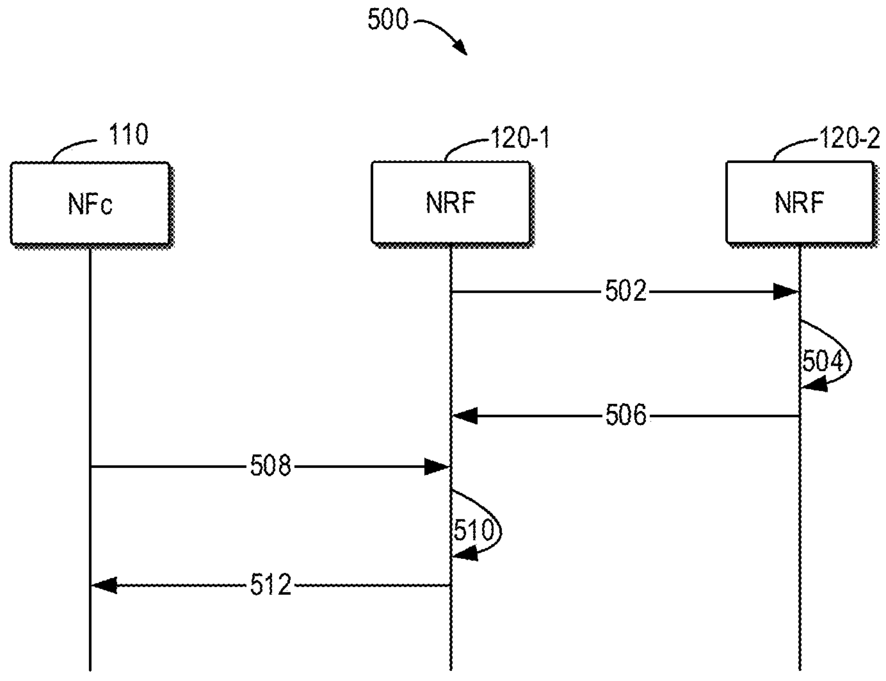

FIG. 5 shows a schematic process 500 of NRF services access authorization. For the purpose of discussion, the process 500 will be described with reference to FIG. 1. The process 500 may involve the NFc 110, the first NRF 120-1 and the second NRF 120-2 as illustrated in FIG. 1. In the scenario shown in FIG. 5, the first NRF 120-1 may act as a visiting NRF and the second NRF 120-2 may act as a home NRF. In the process 500, the NFc 110 may also be replaced by the SCP 140.

As shown in FIG. 5, the first NRF 120-1 may send 502 a bootstrapping request to the second NRF 120-2. The bootstrapping request may comprise the identification of the network associated with the first NRF 120-1.

After receiving the bootstrapping request, the second NRF 120-2 may generate 504 a response to the bootstrapping request. In addition to the bootstrapping information, the response may also comprise an indication of whether an authorization is required for accessing a service provided by the second NRF 120-2. The indication may be associated with the identification of the network associated with the first NRF 120-1.

Then the second NRF 120-2 may send 506 the response to the first NRF 120-1. After obtaining the indication of whether an authorization is required for accessing a service provided by the second NRF 120-2, the first NRF 120-1 may determine the authorization requirement of the second NRF 120-2 based on the indication.

If the first NRF 120-1 determines that the authorization is required for accessing the service provided by the second NRF 120-2, the first NRF 120-1 may record the authorization requirement of the second NRF 120-2.

When the first NRF 120-1 receives 508 a bootstrapping request from the NFc 110, the first NRF 120-1 may generate 510 a response to the bootstrapping request. In addition to the bootstrapping information, the response may also comprise an indication of whether an authorization is required for accessing a service provided by the first NRF 120-1 and also an indication of whether an authorization is required for accessing a service provided by the second NRF 120-2, which may be the roaming partner of the first NRF 120-1. In some example, NRF 120-1 may sends a list of indication of whether an authorization is required for accessing a service provided by the second NRFs per PLMN.

Figure 6:
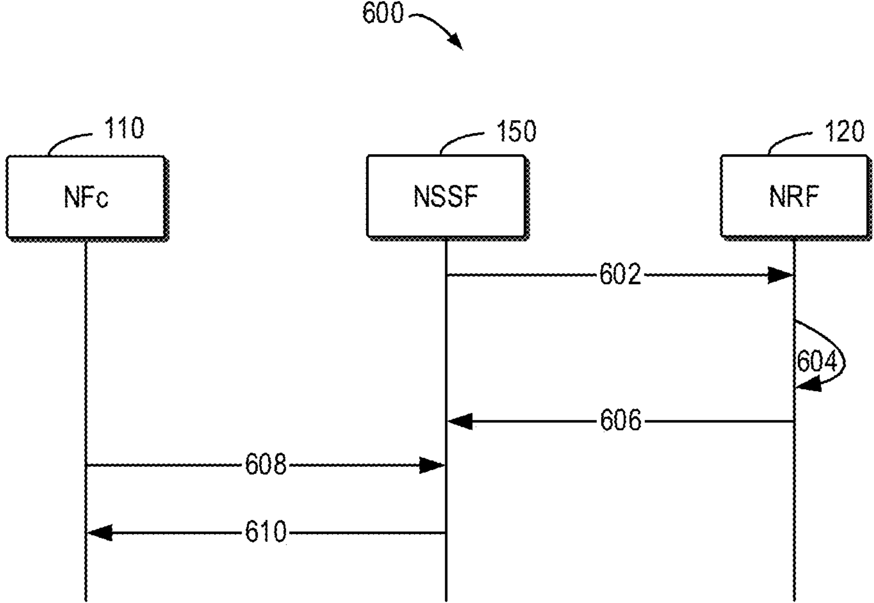

FIG. 6 shows a schematic process 600 of NRF services access authorization. For the purpose of discussion, the process 600 will be described with reference to FIG. 1. The process 600 may involve the NFc 110, the NSSF 150 and the NRF 120 as illustrated in FIG. 1.

As shown in FIG. 6, the NSSF 150 may send 602 a bootstrapping request to the NRF 120. After receiving the bootstrapping request, the second NRF 120 may generate 604 a response to the bootstrapping request. In addition to the bootstrapping information, the response may also comprise an indication of whether an authorization is required for accessing a service provided by the NRF 120.

In some example embodiments (not shown in FIG. 6), the NSSF 150 may be configured with the NRF 120 to use for a given network slice and with the indication an authorization is required for accessing a service provided by the NRF 120.

When the NFc 110 send 608 a request for the network slice selection, for example, the "NSSF Nnssf NSSelection API", to the NSSF 150, the NSSF 150 may send 610 the slice information including the uniform resource identifier (URI) of the NRF 120 and the indication of whether an authorization is required for accessing a service provided by the NRF 120.

Figure 7:
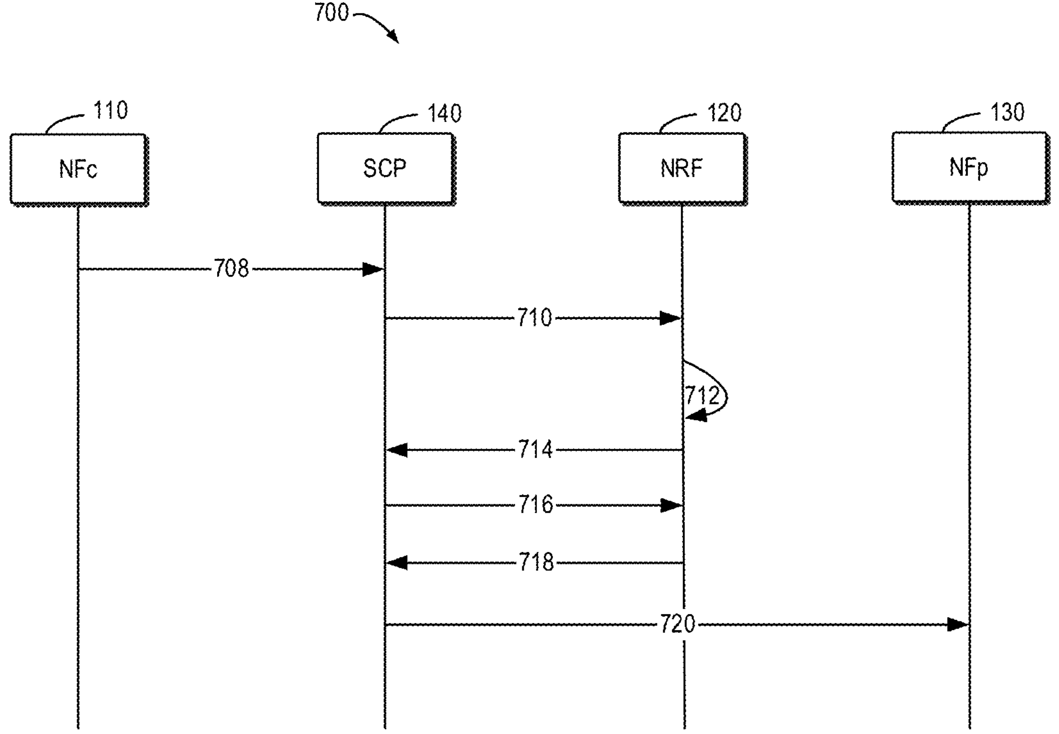

Same extension for indicating the authorization requirement of the NRF can also be signaled to the SCP, in the 3gpp-Sbi-Nrf-Uri header. FIG. 7 shows a schematic process 700 of NRF services access authorization. For the purpose of discussion, the process 700 will be described with reference to FIG. 1. The process 700 may involve the NFc 110, the SCP 140, the NRF 120 and the NFp 130 as illustrated in FIG. 1.

As shown in FIG. 7, the NFc 110 may be aware of the authorization requirement for accessing the service of the NRF 120. When the NFc 110 send 708 a request for a first service to the SCP 140 and the first service required by the NFc 110 must be discovered by the NRF 120, the NFc 110 may include the indication of whether an authorization is required for accessing a second service (for example NF discovery) provided by the NRF 120 in the 3gpp-Sbi-Nrf-Uri header when the NFc 110 sends the request for a first service to the SCP 140.

Then the SCP 140 may send 710 to the NRF 120 a request for the authorization for the SCP 140 to access the second service provided by the NRF 120. If the NRF 120 determines that the second service required by the SCP 140 is authorized to be accessed, the NRF 120 may generate 712 authorization information for the SCP 140 to access the second service. Then the NRF 120 may send 714 the authorization information to the SCP 140.

After obtaining the authorization information, the SCP 140 may send 716 a request for the second service to the NRF 120 including the authorization information. Once the NRF 120 determines that the authorization information for the SCP 140 to access the second service is received and valid, the NRF 120 may provide 718 a NF profile associated with the second service to the SCP 140, for example, if the second service required by the SCP 140 from the NRF 120 is a service of NF discovery. If the SCP 140 determines from the NF profile that the first service required by the NFc 110 is provided by the NFp 130, then the SCP 140 may send 720 a request for the first service required by the NFc 110 to the NFp 130.

In some example embodiments, the 3gpp-Sbi-Nrf-Uri HTTP header is extended as "3gpp-Sbi-Nrf-Uri: nnrf-disc: "https://nrf1.operator.com/nnrf-disc/v1/"; nnrf-nfm: "https://nrf1.operator.com/nnrf-nfm/v1/": nnrf-oauth2: "https://nrf1.operator.com/oauth2/": nnrf-disc-oauth2: true; nnrf-nfm-oauth2: false".

Figure 8:
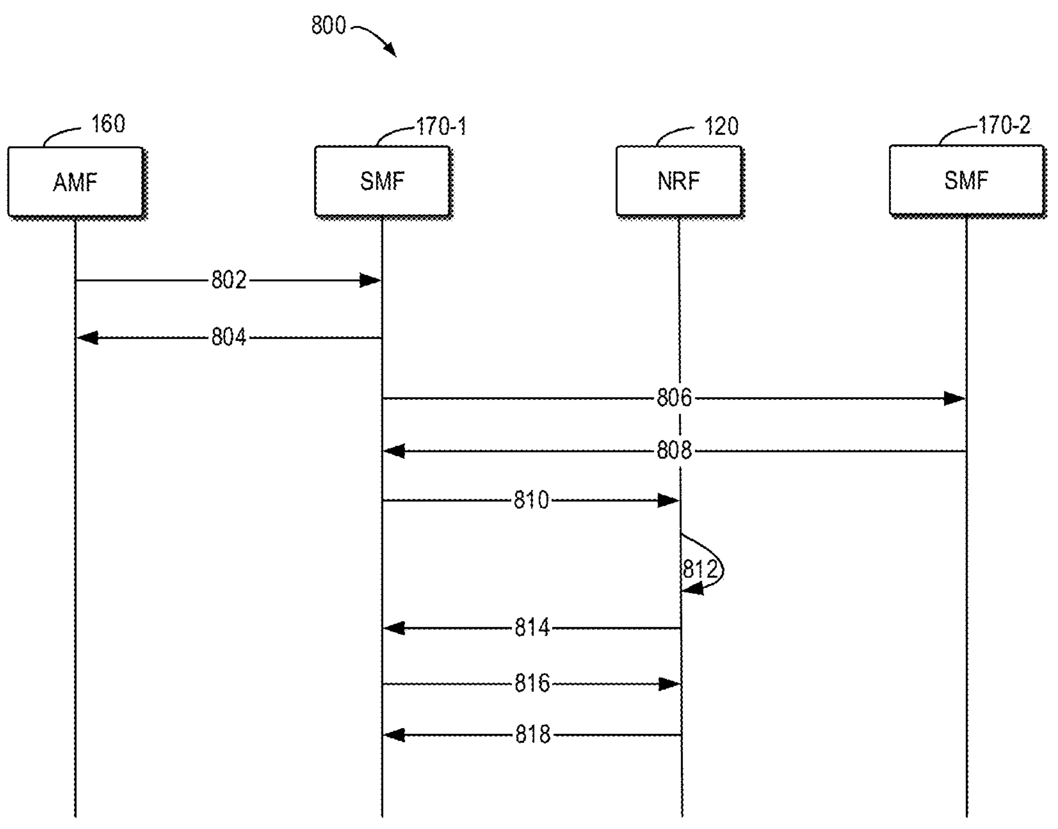

Same extension for indicating the authorization requirement of the NRF can also be signaled to an intermediate SMF (for example the SMF 170-1 as shown in FIG. 1) and a visiting SMF (for example the SMF 170-2 as shown in FIG. 1) in Create SM Context Request. FIG. 8 shows a schematic process 800 of NRF services access authorization. For the purpose of discussion, the process 800 will be described with reference to FIG. 1. The process 800 may involve the AMF 160, the SMF 170-1, the SMF 170-2 and the NRF 120 as illustrated in FIG. 1.

As shown in FIG. 8, the AMF 160 may be aware of the authorization requirement for accessing the service of the NRF 120. When the AMF 160 send 802 create SM context request to the SMF 170-1 and the SM context management after creating the SM context must be performed by the NRF 120, the AMF 160 may include the indication of whether an authorization is required for accessing a second service (for example NF discovery) provided by the NRF 120 in the SM context request when the AMF 160 sends the create SM context request to the SMF 170-1.

After responding 804 the create SM context request with ACK to the AMF 160, the SMF 170-1 send 806 the SM context request to the SMF 170-2. After responding 808 the create SM context request with ACK to the SMF 170-1, the SM context has been created. When the SMF 170-1 requests a service provided by the NRF 120 associated the created SM context, the SMF 170-1 may send 810 to the NRF 120 a request for the authorization for the SMF 170-1 to access the service provided by the NRF 120. If the NRF 120 determines that the service required by the SMF 170-1 is authorized to be accessed, the NRF 120 may generate 812 authorization information for the SMF 170-1 to access the service. Then the NRF 120 may send 814 the authorization information to the SMF 170-1.

After obtaining the authorization information, the SMF 170-1 may send 816 a request for the service to the NRF 120 including the authorization information. For example, the request may be associated with the subscription of the change of SMF status. Once the NRF 120 determines that the authorization information for the SMF 170-1 to access the service is received and valid, the NRF 120 may provide 818 the service to the SMF 170-1.

In some example embodiments, the SCP may also request an access token to access a home NRF services for its own need, e.g., when receiving a service request from NFc using indirect communication with or w/o delegated discovery, if SCP discovered that the home NRF requires OAuth2 based access authorization to access the corresponding NRF service.

Figure 9:
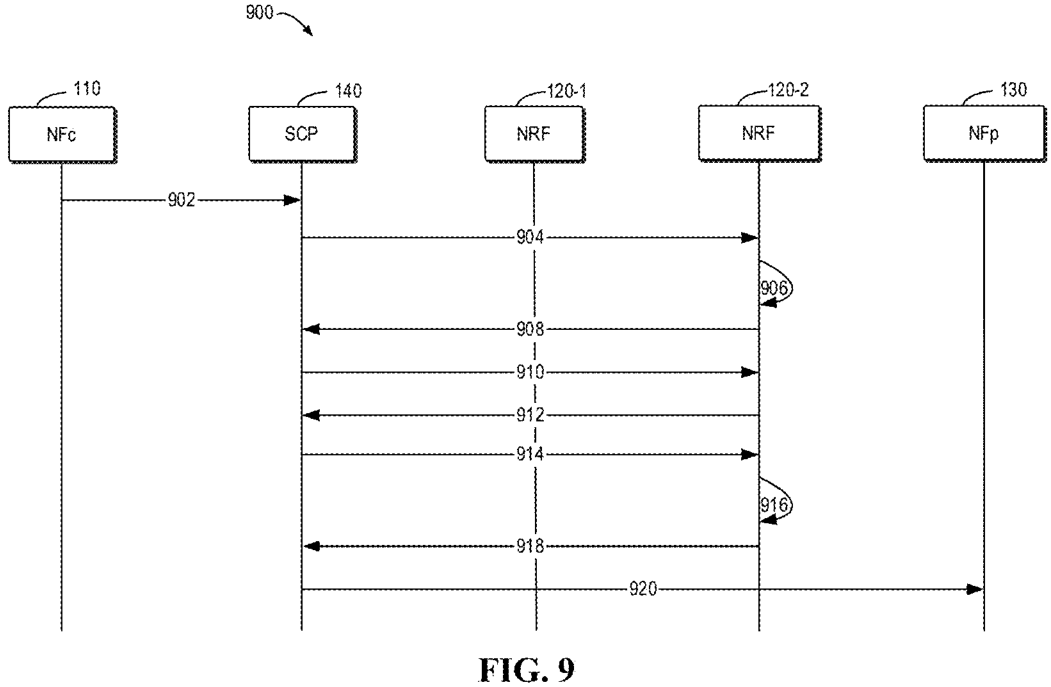

FIG. 9 shows a schematic process 900 of NRF services access authorization. For the purpose of discussion, the process 900 will be described with reference to FIG. 1. The process 900 may involve the NFc 110, the SCP 140, the NRF 120-1, the NRF 120-2 and the NFp 130 as illustrated in FIG. 1.

When the SCP 140 receives 902, from the NFc 110, a request for the service provided by the NRF 120-2 and the SCP 140 is aware of the authorization requirement of the NRF 120-2, the SCP 140 may send 904 to the NRF 120-2 a request for the authorization for the NFc 110 to access the service provided by the NRF 120-2 via the NRF 120-1.

If the NRF 120-2 determines that the service required by the NFc 110 is authorized to be accessed, the NRF 120-2 may generate 906 authorization information for the NFc 110 to access the service. Then the NRF 120-2 may send 908 the authorization information to the SCP 140 via the NRF 120-1.

After obtaining the authorization information, the SCP 140 may send 910 a request for the service to the NRF 120-2 including the authorization information via the NRF 120-1. Once the NRF 120-2 determines that the authorization information for the NFc 110 to access the service is received and valid, the NRF 120-2 may provide 912 the service to the SCP 140 via the NRF 120-1.

Furthermore, if the SCP 140 intends to request a service from the NFp 130, which is managed by the NRF 120-2, the SCP 140 may send 914 to the NRF 120-2 a request for the authorization for the SCP 140 via the NRF 120-1 to access the service provided by the NFp 130. If the NRF 120-2 determines that the service required by the SCP 140 is authorized to be accessed, the NRF 120-2 may generate 916 authorization information for the SCP 140 to access the service provided by the NFp 130. Then the NRF 120-2 may send 918 the authorization information to the SCP 140 via the NRF 120-1. Then the SCP 140 may send 920 a request for the service provided by the NFp 130 including the authorization information to the NFp 130.

With the solution of the present disclosure, the indication of whether an authorization is required for accessing a service provided by the NRF can be provided from the NRF to other NFs, which may improve the system performance without increasing the extra signaling overhead.

Figure 10:
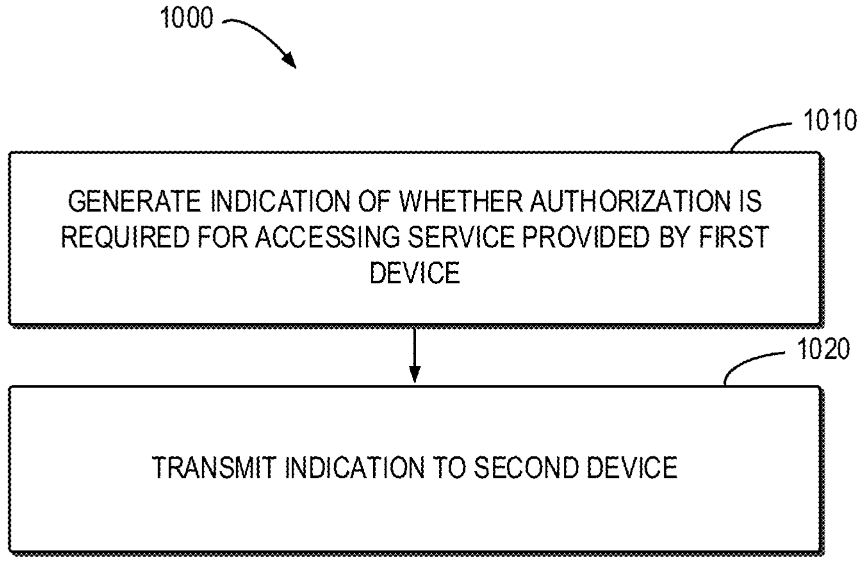
FIG. 10 shows a flowchart of an example method of NRF services access authorization according to some example embodiments of the present disclosure.

FIG. 10 shows a flowchart of an example method 1000 of NRF services access authorization according to some example embodiments of the present disclosure. The method 1000 can be implemented at the first device 110. For the purpose of discussion, the method 1000 will be described with reference to FIG. 1.

At 1010, the first device generates, at a first device, an indication of whether an authorization is required for accessing a service provided by the first device.

In some example embodiments, if the first device determines that a bootstrapping request is received from the second device, the first device may generate the indication along with bootstrapping information as a response for the bootstrapping request.

In some example embodiments, if the first device determines that a bootstrapping request is received from the second device, the first device may obtain an identification of a network associated with the second device from the bootstrapping request; and generate the indication based on the identification information.

At 1020, the first device transmits the indication to a second device.

In some example embodiments, the first device may receive, from the second device, a request for the authorization for accessing the service. If the first device determines that the service is authorized to be accessed by the second device, the first device may transmit, to the second device, authorization information for the second device to access the service. If the first device determines that the authorization information is obtained from a further request for the service received from the second device, the first device may provide the requested service to the second device.

In some example embodiments, the first device may receive, from the second device, a request for the authorization for a third device to access the service. If the first device determines that the service is authorized to be accessed by the third device, the first device may transmit, the second device, authorization information for the third device to access the service. If the first device determines that the authorization information is obtained from a further request for the service received from the second device, the first device may provide the requested service to the second device.

In some example embodiments, the first device may comprise a NRF entity, the second device may comprise one of a NFc, a further NRF entity, a SCP, a NSSF entity, a AMF entity and an intermediate SMF entity.

In some example embodiments, the third device comprises a NFc or a SCP.

Figure 11:
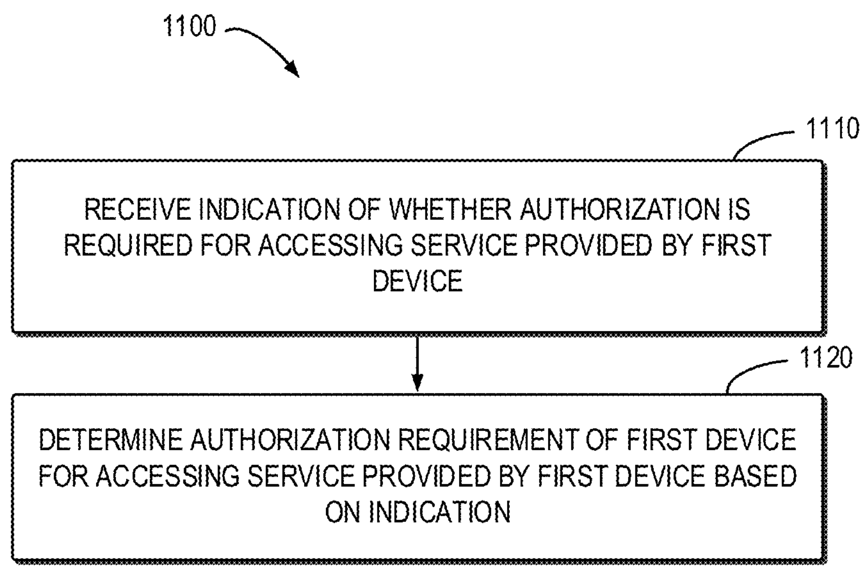
FIG. 11 shows a flowchart of an example method of NRF services access authorization according to some example embodiments of the present disclosure.

FIG. 11 shows a flowchart of an example method 1100 of NRF services access authorization according to some example embodiments of the present disclosure. The method 1100 can be implemented at the second device 120. For the purpose of discussion, the method 1100 will be described with reference to FIG. 1.

At 1110, the second device receives, from a first device, an indication of whether an authorization is required for accessing a service provided by the first device.

In some example embodiments, the second device may transmit a bootstrapping request to the first device and receive, from the first device, the indication along with bootstrapping information from a response for the bootstrapping request.

In some example embodiments, the second device may generate a bootstrapping request based on an identification of a network associated with the second device.

At 1120, the second device determines an authorization requirement of the first device for accessing the service provided by the first device based on the indication.

In some example embodiments, if the second device determines, based on the indication, that the authorization for accessing a service provided by the first device is required by the first device, the second device may transmit a request for the authorization for accessing the service provided by the first device. If the second device determines that authorization information for the second device to access the service is received from the first device, the second device may transmit, to the first device, a further request for the service including the authorization information and receive a response associated with the service provided by the first device.

In some example embodiments, if the second device determines a request for the service is received from a third device, the second device may determine, based on the indication, whether the authorization for accessing a service provided by the first device is required by the first device. If the second device determines that the authorization for accessing the service provided by the first device is required by the first device, the second device may transmit a further request for the authorization for the third device to access the service. If the second device determines that authorization information for the third device to access the service is received from the first device, the second device may transmit, to the first device, the request for the service including the authorization information. If the second device determines that the service was provided by the first device, the second device may respond to the request received from the third device based on the response provided by the first device.

In some example embodiments, if the second device determines a request for the service is received from a third device, the second device may determine, based on the indication, whether the authorization for accessing a service provided by the first device is required by the first device. If the second device determines that the authorization for accessing a service is required by the first device, the second device rejects the request for the service.

In some example embodiments, if the second device determines a further request for the authorization for accessing the service provided by the first device is received from the third device, the second device forwards the further request to the first device: if the second device determines authorization information for the third device to access the service provided by the first device is received from the first device, the second device forwards the authorization information to the third device: if the second device determines the request for the service provided by the first device including the authorization information is received from a third device, the second device forwards the request to the first device; and if the second device determines the service was provided by the first device, the second device responds to the request received from the third device based on the response provided by the first device.

In some example embodiments, if the second device determines a bootstrapping request is received from a third device, the second device may generate a further indication on whether a further authorization is required for accessing a further service provided by the second device, generate a further response for the bootstrapping request based on the further indication and the indication on whether an authorization is required for accessing the service provided by the first device and transmitting the further response for the bootstrapping request to the third device.

In some example embodiments, if the second device determines a bootstrapping request is received from a third device, the second device forwards, to the third device, the indication of whether an authorization is required for accessing a service provided by the first device.

In some example embodiments, if the second device determines a network slice selection procedure is initiated from a third device, the second device transmits the indication on whether an authorization is required for accessing the service provided by the first device to the third device.

In some example embodiments, if the second device determines an authorization for accessing the service provided by the first device is required by the first device based on the indication and the service is to be required by the second device via a third device, the second device transmits the indication to the third device, to cause the third device to transmit a request for the authorization for accessing the service to the first device.

In some example embodiments, if the second device determines based on the indication, that an authorization for accessing the service provided by the first device is required by the first device, the second device record the authorization requirement of the first device.

In some example embodiments, the first device may comprise a NRF entity, the second device may comprise one of a NFc, a further NRF entity, a SCP, a NSSF entity, a AMF entity and an intermediate SMF entity.

In some example embodiments, the third device comprises a NFc or a SCP or a SMF entity:

In some example embodiments, an apparatus capable of performing the method 1000 (for example, implemented at the NRF 120) may comprise means for performing the respective steps of the method 1000. The means may be implemented in any suitable form. For example, the means may be implemented in a circuitry or software module.

In some example embodiments, the apparatus comprises means for generating, at a first device, an indication of whether an authorization is required for accessing a service provided by the first device; and means for transmitting the indication to a second device.

In some example embodiments, an apparatus capable of performing the method 1100 (for example, implemented at a NFc 110, one of the NRF 120-1 or 120-2, a SCP 140, a NSSF 150, an AMF 160 and an intermediate SMF 170-1) may comprise means for performing the respective steps of the method 1100. The means may be implemented in any suitable form. For example, the means may be implemented in a circuitry or software module.

In some example embodiments, the apparatus comprises means for receiving at a second device and from a first device, an indication of whether an authorization is required for accessing a service provided by the first device; and means for determining an authorization requirement of the first device for accessing the service provided by the first device based on the indication.

Figure 12:
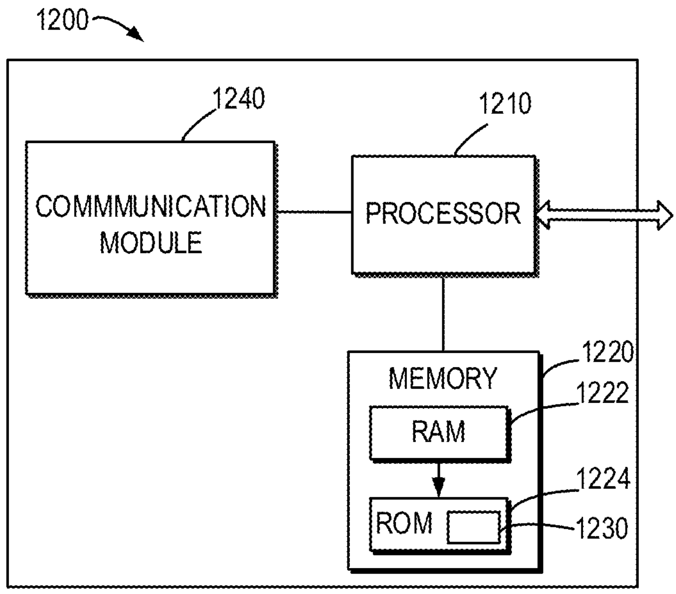
FIG. 12 shows a simplified block diagram of a device that is suitable for implementing example embodiments of the present disclosure.

FIG. 12 is a simplified block diagram of a device 1200 that is suitable for implementing embodiments of the present disclosure. The device 1200 may be provided to implement the communication device, for example NFc 110, NRF 120, a SCP 140, a NSSF 150, an AMF 160 and a SMF 170-1 or 170-2 as shown in FIG. 1. As shown, the device 1200 includes one or more processors 1210, one or more memories 1240 coupled to the processor 1210, and one or more communication modules 1240 coupled to the processor 1210.

The communication module 1240 is for bidirectional communications. The communication module 1240 has one or more communication interfaces to facilitate communication with one or more other modules or devices. The communication interfaces may represent any interface that is necessary for communication with other network elements. In some example embodiments, the communication module 1240 may include at least one antenna.

The processor 1210 may be of any type suitable to the local technical network and may include one or more of the following: general purpose computers, special purpose computers, microprocessors, digital signal processors (DSPs) and processors based on multicore processor architecture, as non-limiting examples. The device 1200 may have multiple processors, such as an application specific integrated circuit chip that is slaved in time to a clock which synchronizes the main processor.

The memory 1220 may include one or more non-volatile memories and one or more volatile memories. Examples of the non-volatile memories include, but are not limited to, a Read Only Memory (ROM) 1224, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1222 and other volatile memories that will not last in the power-down duration.

A computer program 1230 includes computer executable instructions that are executed by the associated processor 1210. The program 1230 may be stored in the ROM 1220. The processor 1210 may perform any suitable actions and processing by loading the program 1230 into the RAM 1220.

The embodiments of the present disclosure may be implemented by means of the program 1230 so that the device 1200 may perform any process of the disclosure as discussed with reference to FIGS. 2 to 9. The embodiments of the present disclosure may also be implemented by hardware or by a combination of software and hardware.

Figure 13:
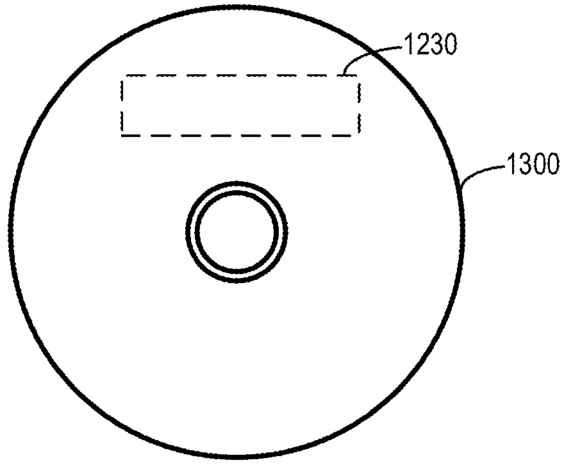
FIG. 13 shows a block diagram of an example computer readable medium in accordance with some embodiments of the present disclosure.

In some embodiments, the program 1230 may be tangibly contained in a computer readable medium which may be included in the device 1200 (such as in the memory 1220) or other storage devices that are accessible by the device 1200. The device 1200 may load the program 1230 from the computer readable medium to the RAM 1222 for execution. The computer readable medium may include any types of tangible non-volatile storage, such as ROM, EPROM, a flash memory, a hard disk, CD, DVD, and the like. FIG. 13 shows an example of the computer readable medium 1300 in form of CD or DVD. The computer readable medium has the program 1230 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 1000-1100 as described above with reference to FIGS. 10-11. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method comprising:

receiving a bootstrapping request from a first device, wherein the first device comprises one of the following:
- a network function consumer,
- a further network repository function entity,
- a service communication proxy,
- a network slice selection function entity,
- an access and mobility management function entity, and
- an intermediate session management function entity;

generating, at a second device, an indication of whether an authorization is required for accessing a service provided by the second device and bootstrapping information as a response to the bootstrapping request; and transmitting the indication and bootstrapping information in the response to the first device.

2. The method of claim 1, further comprising:

receiving, from the first device, a request for the authorization for accessing the service;

in accordance with a determination that the service is authorized to be accessed by the first device, transmitting, to the first device, authorization information for the first device to access the service; and in accordance with a determination that the authorization information is obtained from a further request for the service received from the second device, providing the requested service to the first device.

3. The method of claim 1, further comprising:

receiving, from the first device, a request for the authorization for a third device to access the service;

in accordance with a determination that the service is authorized to be accessed by the third device, transmitting, to the first device, authorization information for the third device to access the service;

in accordance with a determination that the authorization information is obtained from a further request for the service received from the first device, providing the requested service to the first device.

4. The method of claim 1, wherein the second device comprises a network repository function entity.

5. A method comprising:

transmitting a bootstrapping request to a first device;

receiving at a second device and from the first device, an indication of whether an authorization is required for accessing a service provided by the first device and bootstrapping information from a response to the bootstrapping request, wherein the second device comprises one of the following:
- a network function consumer,
- a further network repository function entity,
- a service communication proxy,
- a network slice selection function entity,
- an access and mobility management function entity, and
- an intermediate session management function entity; and determining an authorization requirement of the first device for accessing the service provided by the first device based on the indication.

6. The method of claim 5, further comprising:

in accordance with a determination, based on the indication, that the authorization for accessing the service provided by the first device is required, transmitting a request for the authorization for accessing the service provided by the first device;

in accordance with a determination that authorization information for the second device to access the service is received from the first device, transmitting, to the first device, a further request for the service including the authorization information; and receiving a response associated with the service provided by the first device.

7. The method of claim 5, further comprising:

in accordance with a determination that a request for the service is received from a third device, determining, based on the indication, whether the authorization for accessing the service provided by the first device is required;

in accordance with a determination that the authorization for accessing the service provided by the first device is required, transmitting a further request for the authorization for the third device to access the service;

in accordance with a determination that authorization information for the third device to access the service is received from the first device, transmitting, to the first device, the request for the service including the authorization information;

in accordance with a determination that the service was provided by the first device, responding to the request received from the third device based on the response provided by the first device.

8. The method of claim 5, further comprising:

in accordance with a determination that a request for the service is received from a third device, determining, based on the indication, whether the authorization for accessing the service provided by the first device is required;

in accordance with a determination that the authorization for accessing the service is required by the first device, rejecting the request for the service.

9. The method of claim 8, further comprising:

in accordance with a determination that a further request for the authorization for accessing the service provided by the first device is received from the third device, forwarding the further request to the first device;

in accordance with a determination that authorization information for the third device to access the service provided by the first device is received from the first device, forwarding the authorization information to the third device;

in accordance with a determination that the request for the service provided by the first device including the authorization information is received from a third device, forwarding the request to the first device; and in accordance with a determination that the service is provided by the first device, responding to the request received from the third device based on the response provided by the first device.

10. The method of claim 5, further comprising:

in accordance with a determination that a bootstrapping request is received from a third device, generating a further indication on whether a further authorization is required for accessing a further service provided by the second device;

generating a further response for the bootstrapping request based on the further indication and the indication on whether an authorization is required for accessing the service provided by the first device; and transmitting the further response for the bootstrapping request to the third device.

11. The method of claim 5, wherein the first device comprises a network repository function entity.

12. A first device, comprising:

at least one processor; and at least one memory storing instructions that, when executed by the at least one processor, cause the first device at least to perform:

determining that a bootstrapping request is received from a second device;

generating an indication of whether an authorization is required for accessing a service provided by the first device and bootstrapping information as a response to the bootstrapping request, wherein the first device comprises one of the following:

a network function consumer, a further network repository function entity, a service communication proxy, a network slice selection function entity, an access and mobility management function entity, and an intermediate session management function entity; and transmitting the indication and bootstrapping information in the response to the second device.

13. A second device, comprising:

at least one processor; and at least one memory storing instructions that, when executed by the at least one processor, cause the second device at least to perform:

sending a bootstrapping request to a first device;

receiving from the first device, an indication of whether an authorization is required for accessing a service provided by the first device and bootstrapping information as a response to the bootstrapping request, wherein the second device comprises one of the following:

a network function consumer, a further network repository function entity, a service communication proxy, a network slice selection function entity, an access and mobility management function entity and an intermediate session management function entity; and determining an authorization requirement of the first device for accessing the service provided by the first device based on the indication.

* * * * *